United States Patent [19]
Coast

[11] Patent Number: 5,899,164
[45] Date of Patent: May 4, 1999

[54] TRACKED, AMPHIBIOUS MARSH VEHICLE WITH IMPROVED TRACK AND DRIVE ARRANGEMENT

[75] Inventor: John B. Coast, Baton Rouge, La.

[73] Assignee: Coast Machinery, Inc., Baton Rouge, La.

[21] Appl. No.: 08/908,102

[22] Filed: Aug. 11, 1997

[51] Int. Cl.⁶ ...................................................... B60F 3/00
[52] U.S. Cl. ........................... 114/270; 440/95; 305/127; 305/139
[58] Field of Search ............................... 114/270; 440/96, 440/95; 305/127, 139, 181

[56] References Cited

U.S. PATENT DOCUMENTS

| | | | |
|---|---|---|---|
| 2,546,523 | 3/1951 | Reynolds | 115/1 |
| 3,217,687 | 11/1965 | Eskelson et al. | 115/1 |
| 3,722,961 | 3/1973 | Haley et al. | 305/127 |
| 3,842,785 | 10/1974 | River | 115/1 R |
| 3,853,359 | 12/1974 | Pusch | 305/181 |
| 4,433,634 | 2/1984 | Coast | 114/270 |

*Primary Examiner*—Sherman Basinger
*Attorney, Agent, or Firm*—Garvey, Smith, Nehrbass & Doody, L.L.C.

[57] ABSTRACT

An improved marsh craft construction uses spaced apart pontoons with endless belts (e.g.,. rubber) that encircle the pontoons and ride upon a rail system. Lugs are fastened to the belts for sliding against the rails. Drive wheels have cylindrical pins that intermesh with correspondingly shaped surfaces of the lugs. This improved construction eliminates any roller chain.

19 Claims, 5 Drawing Sheets

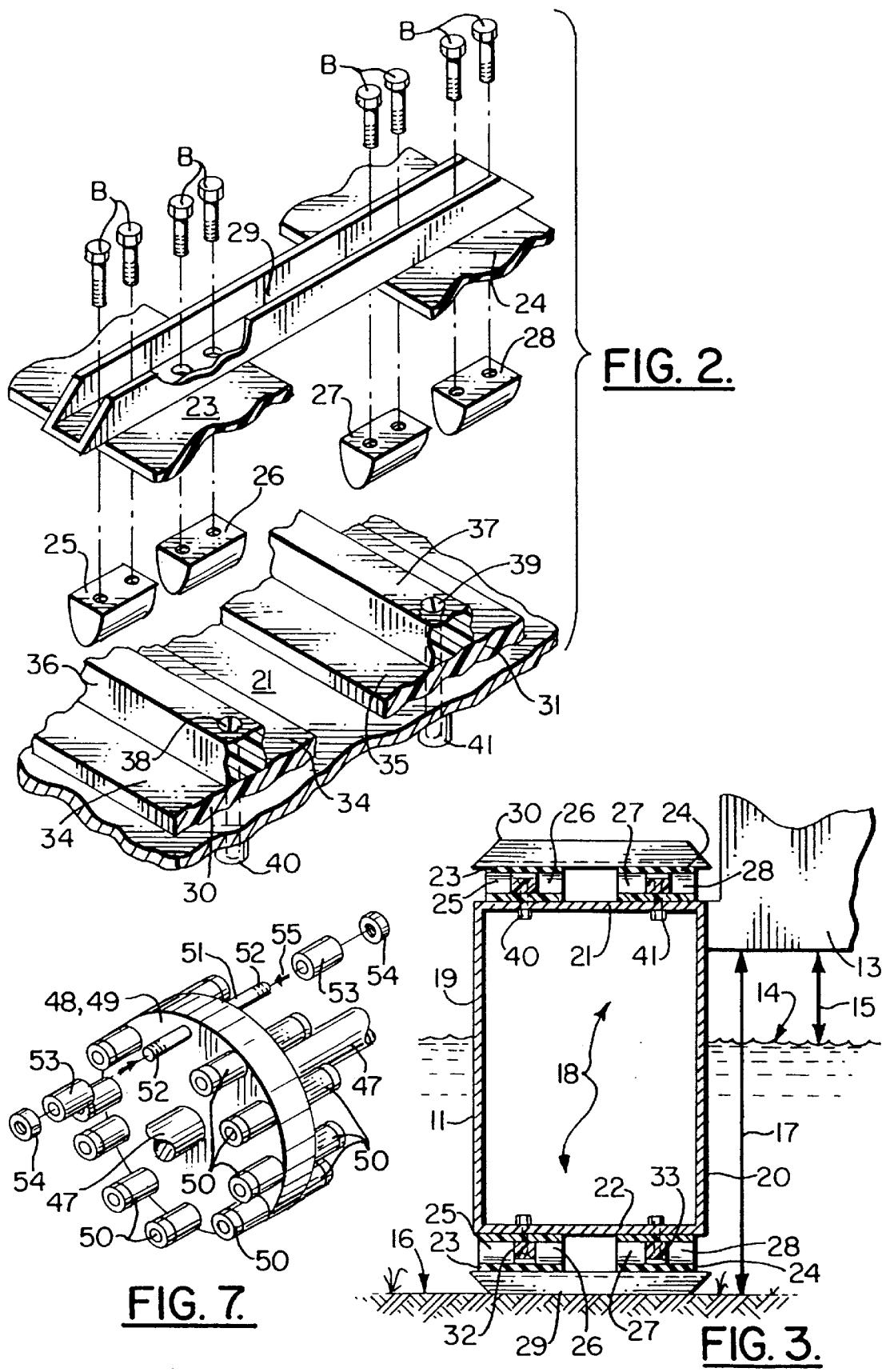

TRACKED, AMPHIBIOUS MARSH VEHICLE WITH IMPROVED TRACK AND DRIVE ARRANGEMENT

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

1. Field of the Invention

The present invention relates to an improved amphibious marsh craft and its track system, and more particularly to an improved track system that maximizes buoyancy by eliminating bogie wheels while eliminating prior art "roller chain" and its lubrication and wear problems.

2. General Background of the Invention

Various types of amphibious marsh crafts are known in the art. One commonly known and cited is U.S. Pat. No. 2,546,523 issued Mar. 27, 1951 to Reynolds which discloses a marsh buggy vehicle comprising a pair of spaced, elongated pontoons disposed and secured in a parallel relationship, two endless chains passing about each pontoon over sprockets mounted on transverse, driven shafts. The chains were joined together transversely by slats which form the threads for the craft.

Another example of an amphibious marsh vehicle is shown in U.S. Pat. No. 3,842,785 issued Oct. 22, 1974 to Rivet. The apparatus described by Rivet included two pontoons, with two endless drive chains carried in channels disposed on top and bottom of the pontoons. The cleats attached to the chains have plastic blocks which are secured to the web of the cleats and bear against the top and bottom of the pontoons.

These and other similar vehicles have a number of operating problems, one of the most common of which is roller chain wear. In operation the chain is exposed to the mud, sand and water, and to prolong the chain life it is a common practice to lubricate the elements of the chain in places of connection. But any lubricant applied to a chain has a tendency to catch and collect dirt and sand, which causes rapid wear of the chain elements, particularly between the carrier roller and pin.

To solve this problem some inventors have come up with the idea of using rubber belts instead of metal chains, as for example in U.S. Pat. No. 3,217,687 issued Nov. 16, 1965 to Erkelson et al., which describes an amphibious vehicle having endless belts provided for operation mainly in water when the belts are substantially submerged.

But such vehicles face another problem when traveling on the ground, this problem being commonly known as "chain" or "track throw," which arises from the inability of many such designs to provide efficient means for securing a chain or a belt in its place over the driving sprockets or wheels.

Additionally, many "marsh buggies" have had the problem of "track sag," which further adds to the problem of track throw.

These problems have been known in the art for a long period of time and, to prevent rapid wear of the elements, a number of solutions have been suggested. In some cases special pads are attached to the sides of a chain in order to reduce friction and thus to eliminate the problem. While these and other solutions have proven to be satisfactory to some extent, they still have not provided full reliability.

In my prior U.S. Pat. No. 4,433,634, there is provided a tracked, amphibious vehicle with a track securement and guide means. The invention shown and described in the '634 patent was designed to prevent "track throw" or loss. The vehicle shown and described in the '634 patent includes two spaced, parallel pontoons joined by a centrally located operator's platform structure, with each pontoon having a moveable track for propulsion, with the track supported on its pontoon by fore and aft sprocket wheel sets and a series of larger bogie wheels at its bottom and smaller guide wheels at its top. Each track comprises a parallel set of rubber, continuous, endless belts joined together by a series of laterally disposed cleats with drive lugs, which lugs are engaged by the teeth of the sprocket wheels. For track securement in the first embodiment (FIG. 5) every fifth cleat includes an inwardly projecting, polyethylene T-hanger retainer which matingly fits and rides in a beam guide attached to the bottom of the pontoon and extends from the initial bottom bogie wheel to the entry of the aft, drive sprocket. In a second embodiment (note FIG. 6), the securing parts are reversed with the T-retainer element being a continuous beam fixed to the bottom of the pontoon and with the mating receptive elements being on the cleats of the track. For track guidance every cleat includes a pair of outwardly facing, inwardly directed, vertical guide members which face the inward or interior sides of the upper and lower bogie wheels to prevent, any lateral forces from moving the track off its pontoon. U.S. Pat. No. 4,433,634 is incorporated herein by reference.

One of the compromises that accompany the use of bogie wheels such as those shown and described in the '634 patent (see for example FIG. 3), is that of reduced pontoon area especially in the lower end portion of the pontoon where the bogie wheels must be located. This necessarily limits the amount of load that can be carried.

Another problem that has long plagued marsh vehicles is the need for endless drive chains that encircle each pontoon, engaging sprockets mounted on the transverse driven shafts. Though chain driven type amphibious marsh crafts have been in use for a number or years, the chain has always been a source of high maintenance, breakage, and down time. The endless roller chains have very small bearings that are quickly worn away by sand, grit, and soil. In some soil conditions, chain wear is much faster than in others. However, the problem of track chain wear has long plagued the art.

BRIEF SUMMARY OF THE INVENTION

The present invention provides an improved amphibious marsh craft that provides a track system that eliminates roller chain and enables maximum pontoon buoyancy by eliminating bogie wheels. The present invention thus provides an improved track amphibious marsh vehicle that includes at least spaced, elongated pontoons disposed generally parallel to one another.

A platform structure supported by and structurally connects the pontoons at their upper surfaces leaving a free clearance under the platform and in between the pontoons through which terrain can pass during use.

A continuous endless belt is provided for each pontoon, each belt encircling its pontoon. Ground engaging cleats are assembled on the outer surface of each belt and they are sized to cover the pontoon bottom for providing traction to the vehicle while protecting the pontoon from puncture.

A series of evenly spaced apart lugs are connected to the inner surface of the belt and cleats assembly and located on opposite sides of the rail on the pontoon to prevent the belt from moving off its longitudinal center. A pair of powered drive members are provided that rotate respectively upon the pontoons, each drive member comprising a rotating drum with circumferentially spaced drive rods that fit in between the lugs during use.

The drive rods engage the lugs at a curved portion of the pontoon wherein the belt sharply turns and angle of more than ninety degrees.

The present invention thus affords advantages over prior art amphibious marsh craft in that it has fewer parts, eliminating roller bearings and roller chain.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 2 is a fragmentary perspective exploded view of the preferred embodiment of the apparatus of the present invention;

FIG. 3 is a partial sectional elevational view of the preferred embodiment of the apparatus of the present invention;

FIG. 7 is a fragmentary perspective view of the preferred embodiment of the apparatus of the present invention illustrating the drive member and its drive rods;

DETAILED DESCRIPTION OF THE INVENTION

Figure 1:
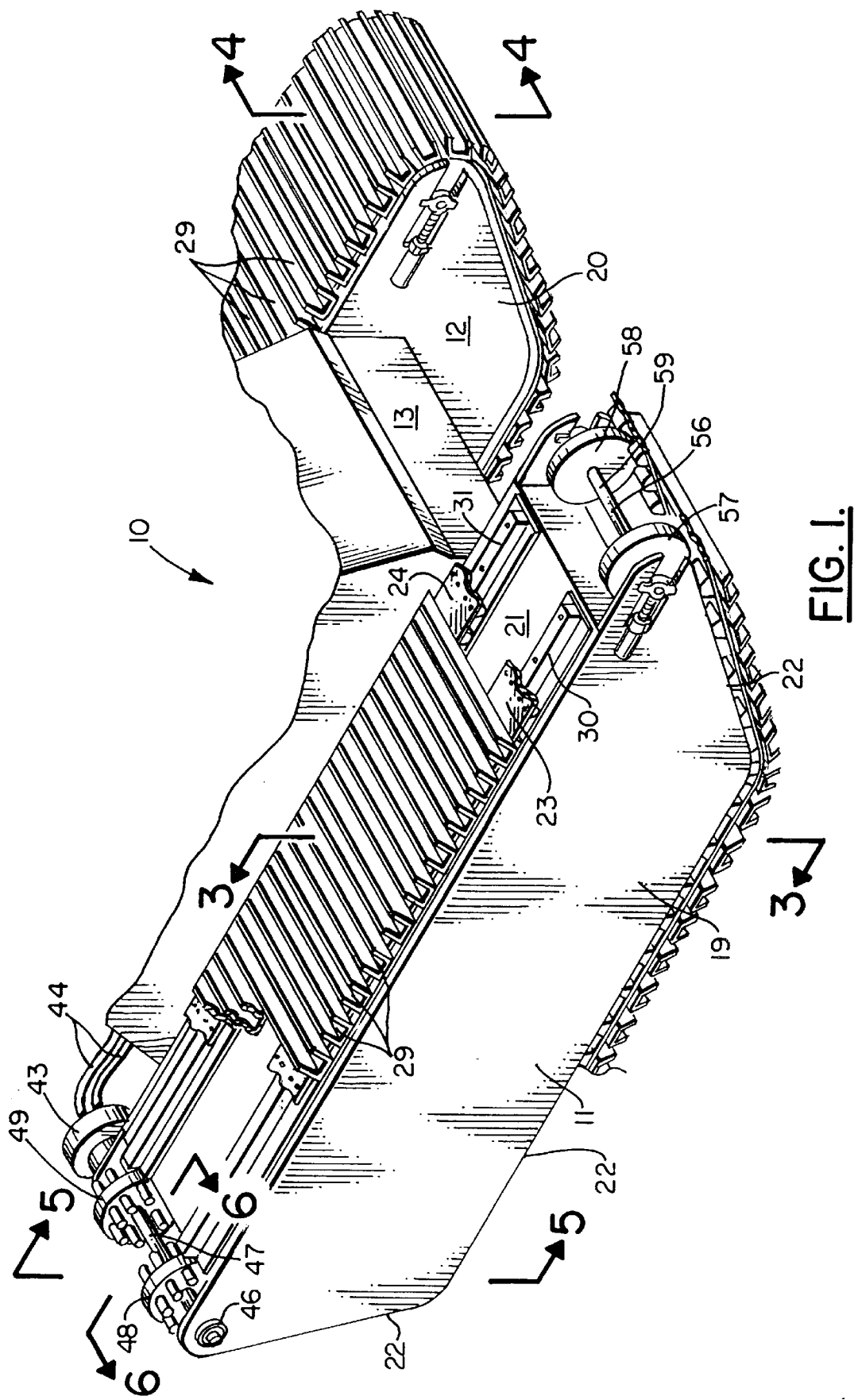
FIG. 1 is a partial perspective view of the preferred embodiment of the apparatus of the present invention.

FIGS. 1–6 show the preferred embodiment of the apparatus of the present invention designated generally by the numeral 10 in FIG. 1. Amphibious marsh vehicle 10 includes a pair of spaced apart pontoons 11, 12 connected by a rigid platform 13 that can be of welded steel construction, for example. The platform 13 can support the vehicle operator, other personnel, and equipment such as a backhoe, seismic equipment and the like.

During use, the pontoons enable the vehicle 10 to float a distance above a water surface 14 as shown in FIG. 3, designated by the arrow 15.

In FIG. 3, a terrain surface 16 is also schematically illustrated for showing where the vehicle 10 engages the terrain surface 16 with its plurality of cleats 29. Each pontoon 11, 12 is constructed in accordance with the sectional views of FIGS. 3 and 5. Each pontoon 11, 12 has an interior 18, an outer sidewall 19 and an inner sidewall 20 that is positioned next to the rigid platform 13. Each pontoon 11, 12 also includes a top wall 21 and a bottom wall 22.

A pair of endless belts 23, 24 are positioned to extend around each pontoon 11, 12. Each endless belt can be of rubber, polymeric material, or metal (e.g., steel) construction, for example.

As shown in FIG. 2, a plurality of plastic (e.g., U.H.M.W. polyethylene) lugs 25, 26, 27, 28 are fastened to each belt 23, 24. A plurality of cleats 29 are affixed to the belts 23, 24 a shown in FIGS. 1–6.

A plurality of (e.g., steel or plastic) runways 30, 31, 32, 33 are provided upon upper and lower surfaces of pontoons 11, 12 that are encircled by belts 23, 24 as shown in FIGS. 1 and 2, for example. The same runways 30–33 are provided on the bottom 22 of pontoon 11, 12 as are provided on the top 21 surface as shown in FIGS. 1, 2 and 3. The runways 30, 31, 32, 33 are comprised of plate members 34, 35 and rail members 36, 37 as shown in FIG. 2. Bolts 38, 39 and nuts 40, 41 are used to form bolted connections through rails 36, 37 and plates 34, 35 as shown in FIG. 2. These bolted connections using bolts 38, 39 and nuts 40, 41 are used to attach the plate members 34,35 and rails 36,37 to the top surface 21 of each pontoon 11, 12. The rails 36, 37 can be metal or plastic.

Figure 4:
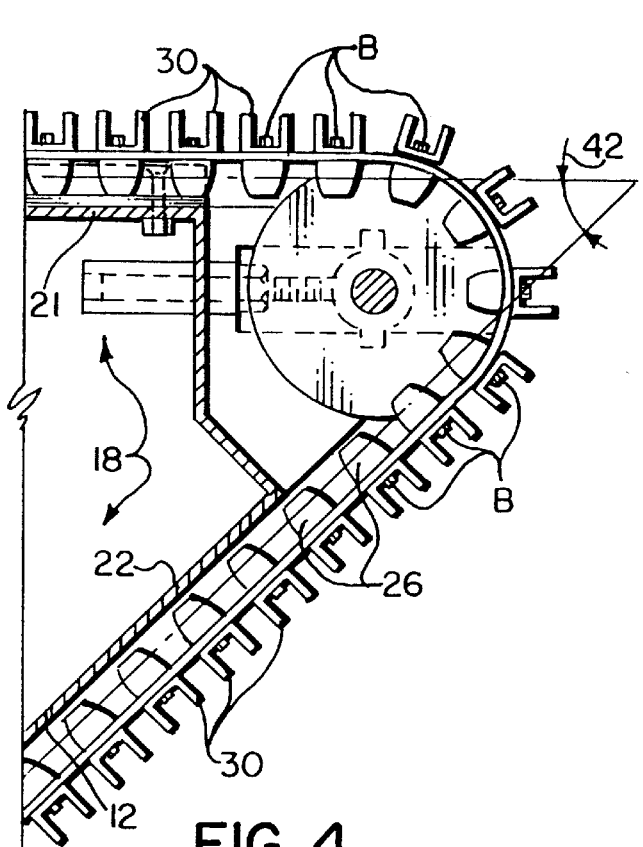
FIG. 4 is a fragmentary side view of the preferred embodiment of the apparatus of the present invention.

The endless belts 23, 24 and the attached cleats 29 travel through a curved path that is defined by the angle 42 indicated by the curved arrow 42 in FIG. 4. A hydraulic motor 43 can be used to power the endless belts 23, 24 about the pontoons 11, 12. Hydraulic motor 43 can be supplied with pressurized hydraulic fluid using hydraulic fluid hoses 44.

Figure 6:
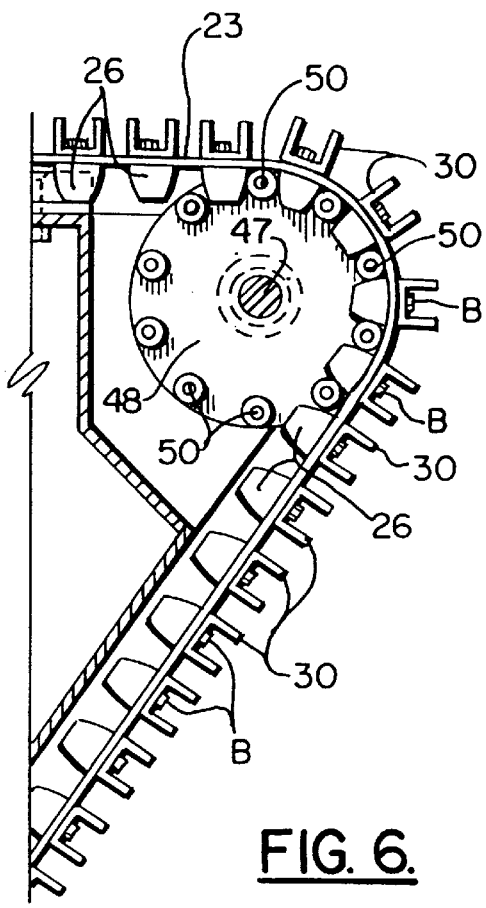
FIG. 6 is a fragmentary transverse elevational view of the preferred embodiment of the apparatus of the present invention illustrating the drive member, drive rods, cleats, belt, and pontoon.
Figure 5:
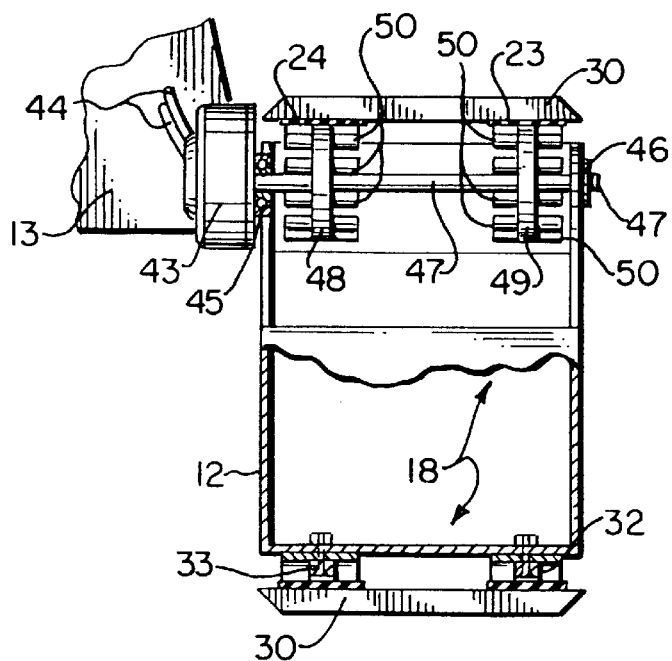
FIG. 5 is a sectional elevational view of the preferred embodiment of the apparatus of the present invention.
Figure 8:
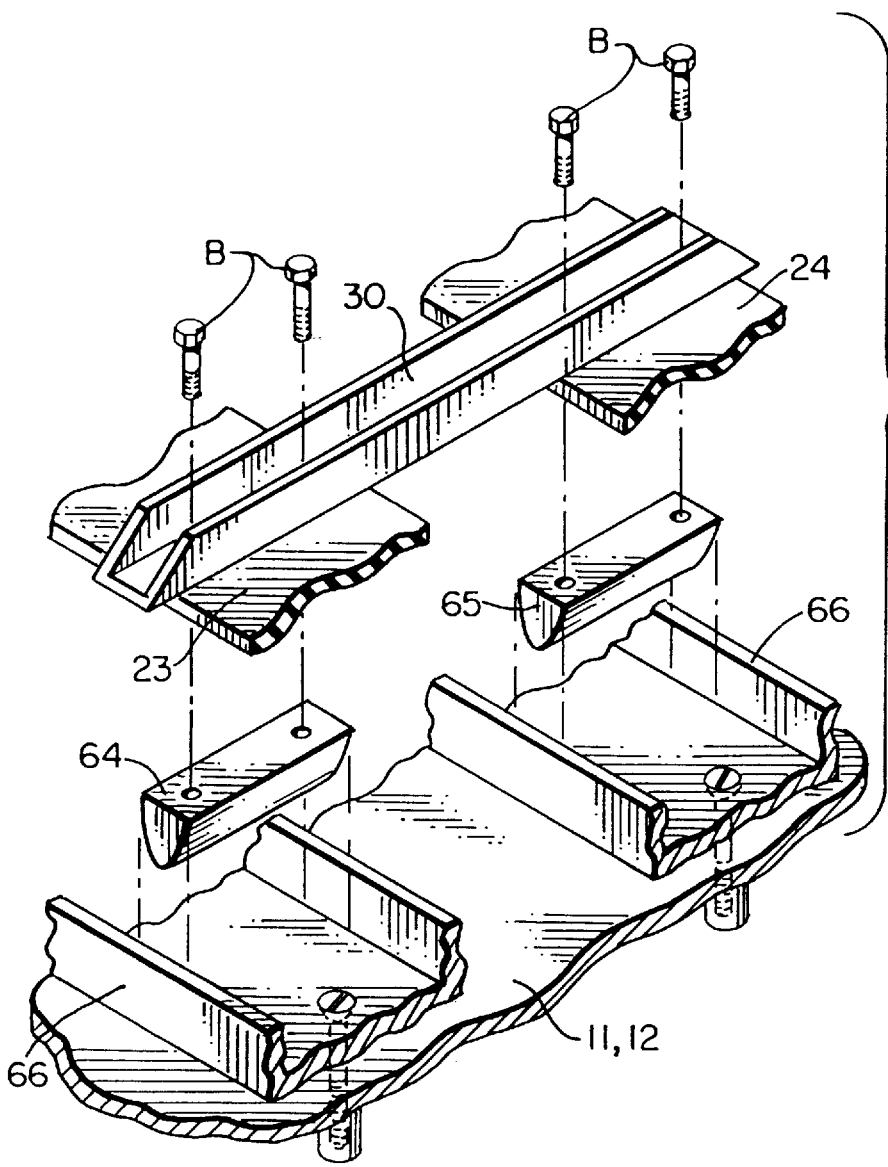
FIG. 8 is a perspective fragmentary view of the preferred embodiment of the apparatus of the present invention illustrating the pontoon, belts, cleats, and lugs.
Figure 9:
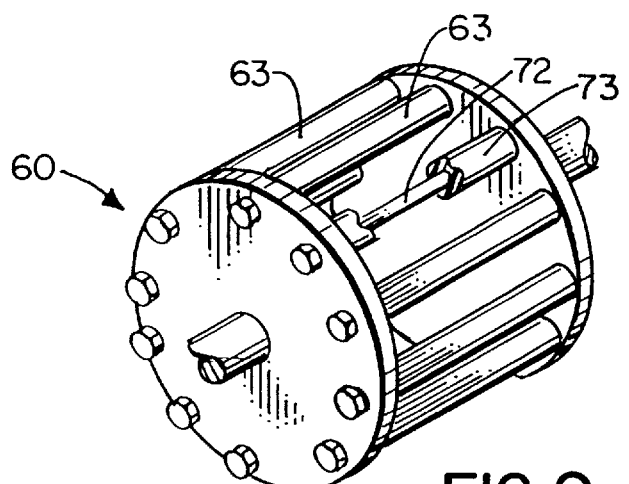
FIG. 9 is a perspective view of the preferred embodiment of the apparatus of the present invention illustrating a second version of the drive member.
Figure 10:
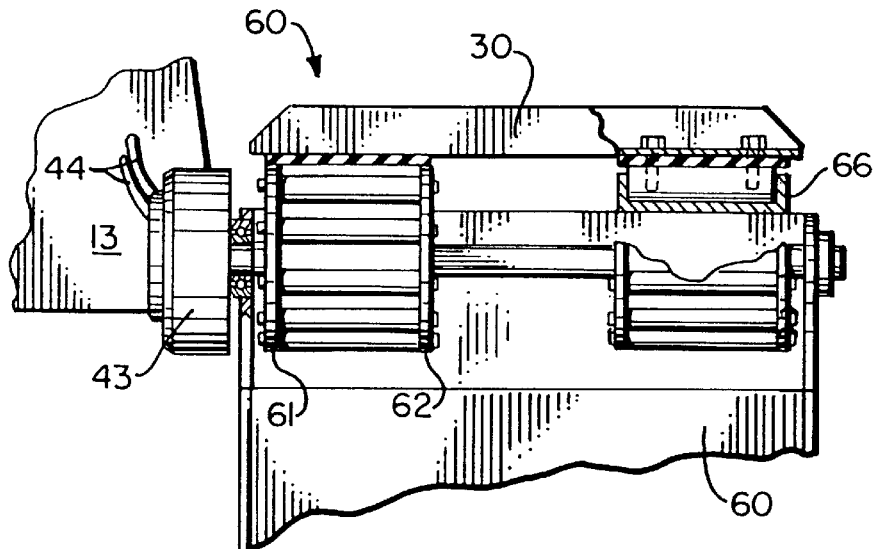
FIG. 10 is a fragmentary sectional elevational view of the preferred embodiment of the apparatus of the present invention showing the second version of the drive member and lugs.
Figure 11:
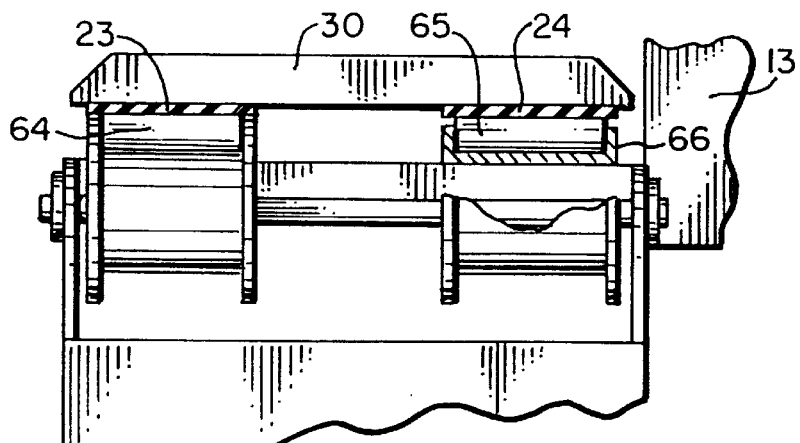
FIG. 11 is a sectional elevational view of the preferred embodiment of the apparatus of the present invention.
Figure 12:
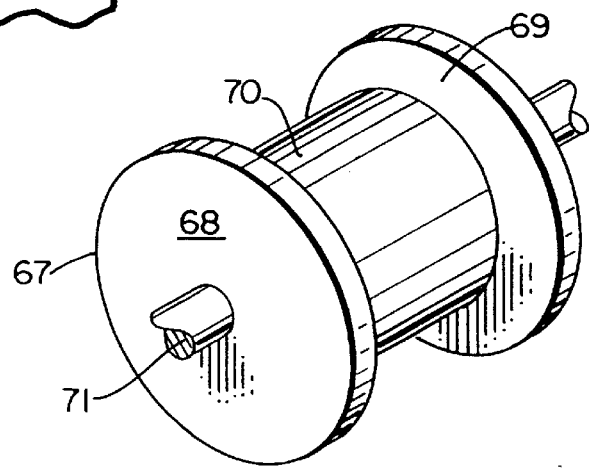
FIG. 12 is a fragmentary perspective view of the preferred embodiment of the apparatus of the present invention.

Rotary bearings 45, 46 are affixed to opposed sides of pontoons 11, 12 as shown in FIG. 5 for supporting a drive shaft 47. Drums 48, 49 are mounted on drive shaft 47 and rotate therewith when hydraulic motor 43 is activated. Each drum 48, 49 includes a plurality of pin members 50 that engage the plurality of lugs 26 as shown in FIGS. 5 and 6.

Each pin 50 includes a stud 51 having an externally threaded end 52 and a bushing 53 with a nut 54. This construction can be seen in FIG. 7 wherein arrow 55 shows that assembly of bushing 53 and nut 54 to stud 51.

Idler wheels 56 are used for routing the endless belts 23, 24 and their cleats 29 about the front end portion of the vehicle 10 as shown in FIG. 1. Each idler wheel 56 includes a pair of spaced apart discs 57, 58 mounted upon drive shaft 59.

FIGS. 8–12 show the preferred embodiment of the apparatus of the present invention when used with a second version of the drive member. In FIGS. 8–12, the drive member 60 is comprised of a pair of spaced apart discs 61, 62 connected by a plurality of pins 63.

The drive member 60 cooperates with lugs 64, 65 that are wider than the lugs 25–26 and 27–28 of the embodiment shown in FIGS. 1–7. Each lug 64, 65 travels in a runway 66. An idler member 67 is sized and shaped to receive the lugs 64, 65. The idler member 67 includes a pair of spaced apart discs 68, 69 and a rotating drum 70. Shaft 71 is mounted in bearings, for example, to the pontoons 11, 12. Each pin 63 can include a rod 72 having a bushing 73 thereon as shown if FIG. 9.

PARTS LIST

The following is a list of suitable parts and materials for the various elements of the preferred embodiment of the present invention.

| Part Number | Description |
| --- | --- |
| 10 | amphibious marsh vehicle |
| 11 | pontoon |
| 12 | pontoon |
| 13 | platform |
| 14 | water level |
| 15 | arrow |
| 16 | terrain surface |
| 17 | arrow |
| 18 | interior |
| 19 | outer sidewall |
| 20 | inner sidewall |
| 21 | top wall |
| 22 | bottom wall |
| 23 | endless belt |
| 24 | endless belt |
| 25 | plastic lug |
| 26 | plastic lug |
| 27 | plastic lug |
| 28 | plastic iug |
| 29 | cleat |
| 30 | runway |
| 31 | runway |
| 32 | runway |
| 33 | runway |
| 34 | plate |
| 35 | plate |
| 36 | rail |
| 37 | rail |
| 38 | bolt |
| 39 | bolt |
| 40 | nut |
| 41 | nut |
| 42 | curved arrow |
| 43 | hydraulic motor |
| 44 | hydraulic fluid hose |
| 45 | rotary bearing |
| 46 | rotary bearing |
| 47 | drive shaft |
| 48 | drum |
| 49 | drum |
| 50 | pin |
| 51 | stud |
| 52 | externally threaded end |
| 53 | bushing |
| 54 | nut |
| 55 | arrow |
| 56 | idler wheel |
| 57 | disk |
| 58 | disk |
| 59 | shaft |
| 60 | drive member |
| 61 | disk |
| 62 | disk |
| 63 | pin |
| 64 | lug |
| 65 | lug |
| 66 | runway |
| 67 | idler member |
| 68 | disk |
| 69 | disk |
| 70 | rotating drum |
| 71 | shaft |
| 72 | rod |
| 73 | bushing |
| 73B | bolted connection |

The foregoing embodiments are presented by way of example only; the scope of the present invention is to be limited only by the following claims.

I claim:

1. A tracked, amphibious marsh vehicle, comprising:
   a) at least two, spaced, elongated pontoons disposed generally parallel to one another, each pontoon having a longitudinally extending runway and at least one curved end portion;
   b) a platform structure supported by and structurally connecting the pontoons at their upper surface leaving a free clearance area under the platform and between the pontoons through which terrain can pass when the vehicle is moving;
   c) a continuous, endless belt encircling each pontoon, the belts having inner and outer surfaces;
   d) a plurality of ground-engaging cleats assembled on the outer surface of each belt, the plurality of cleats covering the pontoon bottom for providing traction to the vehicle;
   e) a series of evenly spaced apart lugs connected to the inner surface of the belt and cleats assembly and the lugs engaging the runway to retard the belt from moving laterally off its longitudinal center;
   f) a pair of powered drive members that rotate respectively upon the pontoons, each drive member comprising a rotating drum with circumferentially spaced drive rods that fit in between the lugs during use; and
   g) wherein the drive rods engage the lugs at a position adjacent to the curved end portion of the pontoon wherein the belt sharply turns an angle and wherein the rods drive the belt at the curved end portion.

2. The amphibious marsh vehicle of claim 1 wherein the belt turns an angle of more than ninety degrees at the curved end portion of the pontoon.

3. The amphibious marsh vehicle of claim 1 wherein a lug is bolted to the belt at a position opposite a cleat.

4. The amphibious marsh vehicle of claim 3 further providing a plurality of bolted connections for assembling the lugs and cleats to the belts, wherein each bolted connection is fastened to the combination of a cleat, a lug and a belt.

5. The amphibious marsh vehicle of claim 3 wherein a plurality of bolted connections assembles a plurality of lugs to a cleat and at least one belt.

6. The amphibious marsh vehicle of claim 3 wherein a plurality of bolted connections assembles a plurality of lugs to a cleat and a plurality of belts.

7. The amphibious marsh vehicle of claim 1 wherein each drive member has a plurality of drive rods and during use, a drive rod engages and drives a single lug.

8. The amphibious marsh vehicle of claim 1 wherein each drive member has a plurality of drive rods and during use, a drive rod engages and drives a plurality of lugs.

9. The amphibious marsh vehicle of claim 1 wherein the runways include a rail portion and there are a pair of lugs positioned on opposite sides of the rail portion.

10. The amphibious marsh vehicle of claim 1 wherein the runways include a pair of opposed side walls with a slot therebetween and a lug travels in the slot, in between the side walls.

11. A tracked, amphibious marsh vehicle, comprising:
   a) at least two, spaced, elongated pontoons disposed generally parallel to one another, each pontoon having a longitudinally extending runway and at least one curved end portion;

b) a platform structure supported by and structurally connecting the pontoons at their upper surface leaving a free clearance area under the platform and between the pontoons through which terrain can pass when the vehicle is moving;

c) a continuous, endless belt encircling each pontoon, the belts having inner and outer surfaces;

d) a plurality of ground-engaging cleats assembled on the outer surface of each belt, the plurality of cleats covering the pontoon bottom for providing traction to the vehicle;

e) a series of spaced apart lugs affixed to the inner surface of the belt and cleats assembly, the runway and lugs being cooperatively configured so that the runways retard lateral movement of the belts by providing longitudinally extending rail surfaces that engage the lugs during use;

f) a pair of powered drive members that rotate respectively upon the pontoons, each drive member comprising a rotating drum with circumferentially spaced drive rods that fit in between the lugs during use; and g) wherein the drive rods engage the lugs at a position adjacent to the curved end portion of the pontoon wherein the belt sharply turns an angle and wherein the rods drive the belt at the curved end portion.

12. The amphibious marsh vehicle of claim 11 wherein the belt turns an angle of more than ninety degrees at the curved end portion of the pontoon.

13. The amphibious marsh vehicle of claim 11 wherein a lug is bolted to the belt at a position opposite a cleat.

14. The amphibious marsh vehicle of claim 13 further providing a plurality of bolted connections for assembling the lugs and cleats to the belts, wherein each bolted connection is fastened to the combination of a cleat, a lug and a belt.

15. The amphibious marsh vehicle of claim 13 wherein a plurality of bolted connections assembles a plurality of lugs to a cleat and at least one belt.

16. The amphibious marsh vehicle of claim 13 wherein a plurality of bolted connections assembles a plurality of lugs to a cleat and a plurality of belts.

17. The amphibious marsh vehicle of claim 11 wherein each drive member has a plurality of drive rods and during use, a drive rod engages and drives a single lug.

18. The amphibious marsh vehicle of claim 11 wherein each drive member has a plurality of drive rods and during use, a drive rod engages and drives a plurality of lugs.

19. The amphibious marsh vehicle of claim 11 wherein the runways include a rail portion and there are a pair of lugs positioned on opposite sides of the rail portion.

* * * * *